(12) United States Patent
Goodwin, III

(10) Patent No.: US 6,510,991 B2
(45) Date of Patent: *Jan. 28, 2003

(54) SYSTEM AND METHOD OF DISPLAYING INFORMATION ABOUT AN ITEM BY AN ELECTRONIC DISPLAY

(75) Inventor: John C. Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/824,846

(22) Filed: Apr. 2, 2001

(65) Prior Publication Data

US 2002/0139847 A1 Oct. 3, 2002

(51) Int. Cl.[7] .............................................. G06K 15/00
(52) U.S. Cl. ..................................................... 235/383
(58) Field of Search ................................ 235/375, 383; 340/825.34, 572; 283/81; 705/16

(56) References Cited

U.S. PATENT DOCUMENTS

| 4,816,824 | A | | 3/1989 | Katz et al. ............. 340/825.34 |
|---|---|---|---|---|
| 5,151,684 | A | | 9/1992 | Johnsen ....................... 340/572 |
| 5,239,167 | A | | 8/1993 | Kipp ........................... 235/383 |
| 5,726,431 | A | * | 3/1998 | VanDonkelaar et al. ..... 235/375 |
| 5,758,064 | A | * | 5/1998 | Zimmerman et al. ........ 235/383 |
| 6,019,394 | A | | 2/2000 | Chenoweth et al. .......... 283/81 |
| 6,021,395 | A | * | 2/2000 | Goodwin, III .............. 235/383 |
| 6,047,263 | A | * | 4/2000 | Goodwin, III .............. 235/375 |
| 6,173,268 | B1 | * | 1/2001 | Goodwin, III ............... 705/14 |

* cited by examiner

Primary Examiner—Karl D. Frech
Assistant Examiner—Lisa M. Caputo
(74) Attorney, Agent, or Firm—Paul W. Martin

(57) ABSTRACT

A system and method of displaying information about an item which uses a radio frequency signal to change displayed information. The system includes a display, a memory including a first memory location containing first display information and a second memory location containing second display information, and control circuitry which receives the radio frequency signal from a portable transmitter and displays the second information from the second memory location in response to the radio frequency signal. The control circuitry additionally senses a loss of the radio frequency signal and displays the first information from the first memory location in response to the loss of the radio frequency signal. One illustrative example envisions an electronic price label.

7 Claims, 3 Drawing Sheets

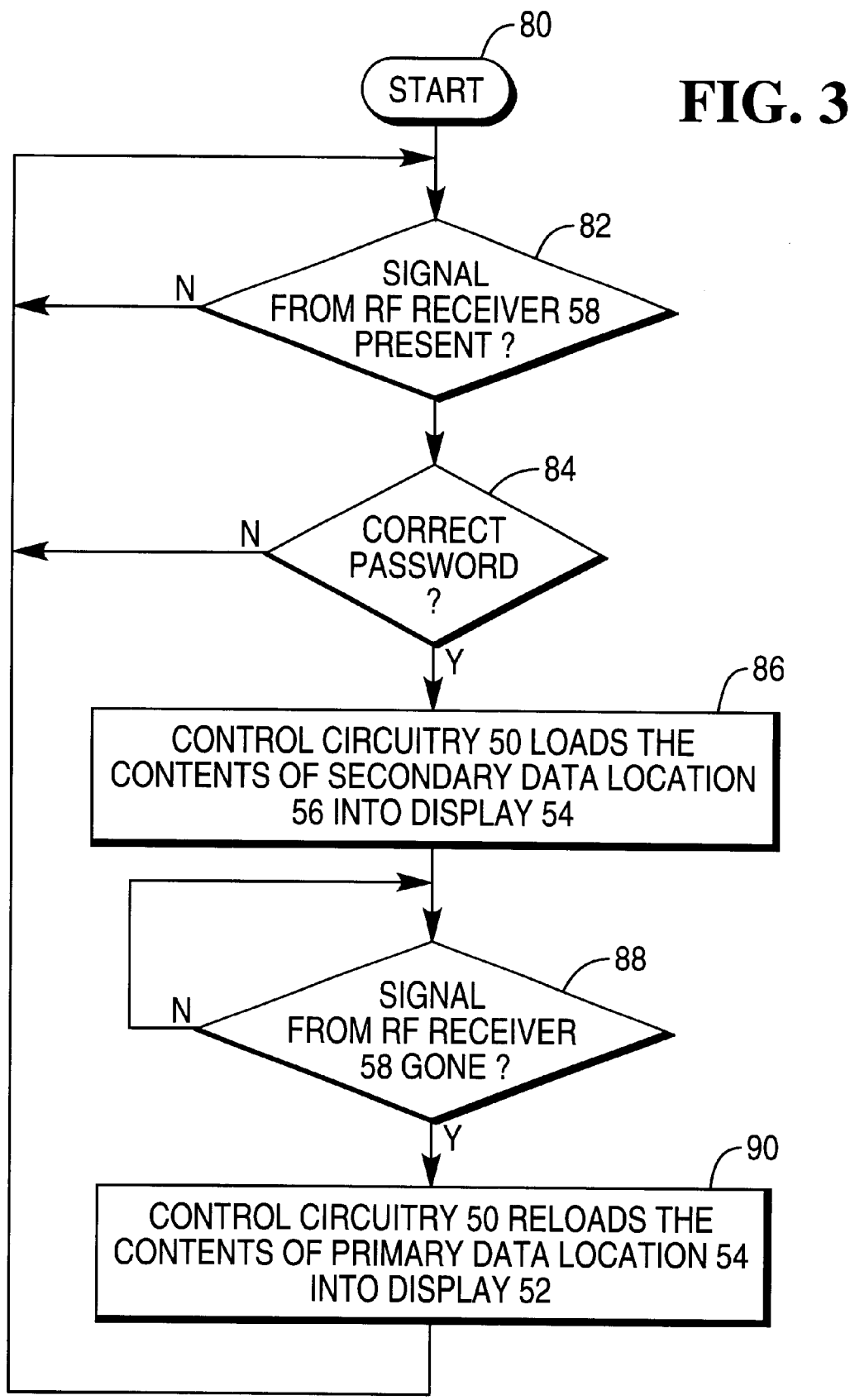

SYSTEM AND METHOD OF DISPLAYING INFORMATION ABOUT AN ITEM BY AN ELECTRONIC DISPLAY

BACKGROUND OF THE INVENTION

The present invention relates to electronic price label (EPL) systems, and more specifically to a system and method of displaying information about an item by an electronic display.

EPL systems typically include a plurality of EPLs for merchandise items in a transaction establishment. EPLs typically display the price of corresponding merchandise items on store shelves and are typically attached to a rail or shelf channel along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file.

Store associates must perform routine tasks throughout the store and require information to support operation of the store. Associates use information such as plan-o-gram information, sales information, and stock information.

Therefore, it would be desirable to provide a system and method of displaying information about an item including plan-o-gram information, sales information, and stock information by an EPL to assist a store associate. It would also be desirable for the system to automatically display the information when the store associate is near the EPL.

SUMMARY OF THE INVENTION

In accordance with the teachings of the present invention, a system and method of displaying information about an item by an electronic display, such as an electronic price label (EPL) is provided.

One embodiment of the system includes a display, a memory including a first memory location containing first display information and a second memory location containing second display information, and control circuitry which receives the radio frequency signal from a portable transmitter and displays the second information from the second memory location in response to the radio frequency signal. The control circuitry additionally senses a loss of the radio frequency signal and displays the first information from the first memory location in response to the loss of the radio frequency signal.

One embodiment of the method includes the steps of displaying first information from a first memory location in an electronic price label, receiving a radio frequency signal from a portable transmitter, and displaying second information from a second memory location in the electronic price label. The method may additionally include the steps of sensing a loss of the radio frequency signal, and displaying the first information from the first memory location in response to the loss of the radio frequency signal.

It is accordingly an object of the present invention to provide a system and method of displaying information about an item by an electronic display.

It is another object of the present invention to provide a system and method of automatically displaying information about an item by an EPL when a store associate is near the EPL.

It is another object of the present invention to store business information in a secondary data location within an EPL and display the contents of the secondary data location when a triggering RF signal is near the EPL.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 3 is a flow diagram illustrating the information display method of the present invention.

DETAILED DESCRIPTION OF THE PREFERRED EMBODIMENT

Figure 1:
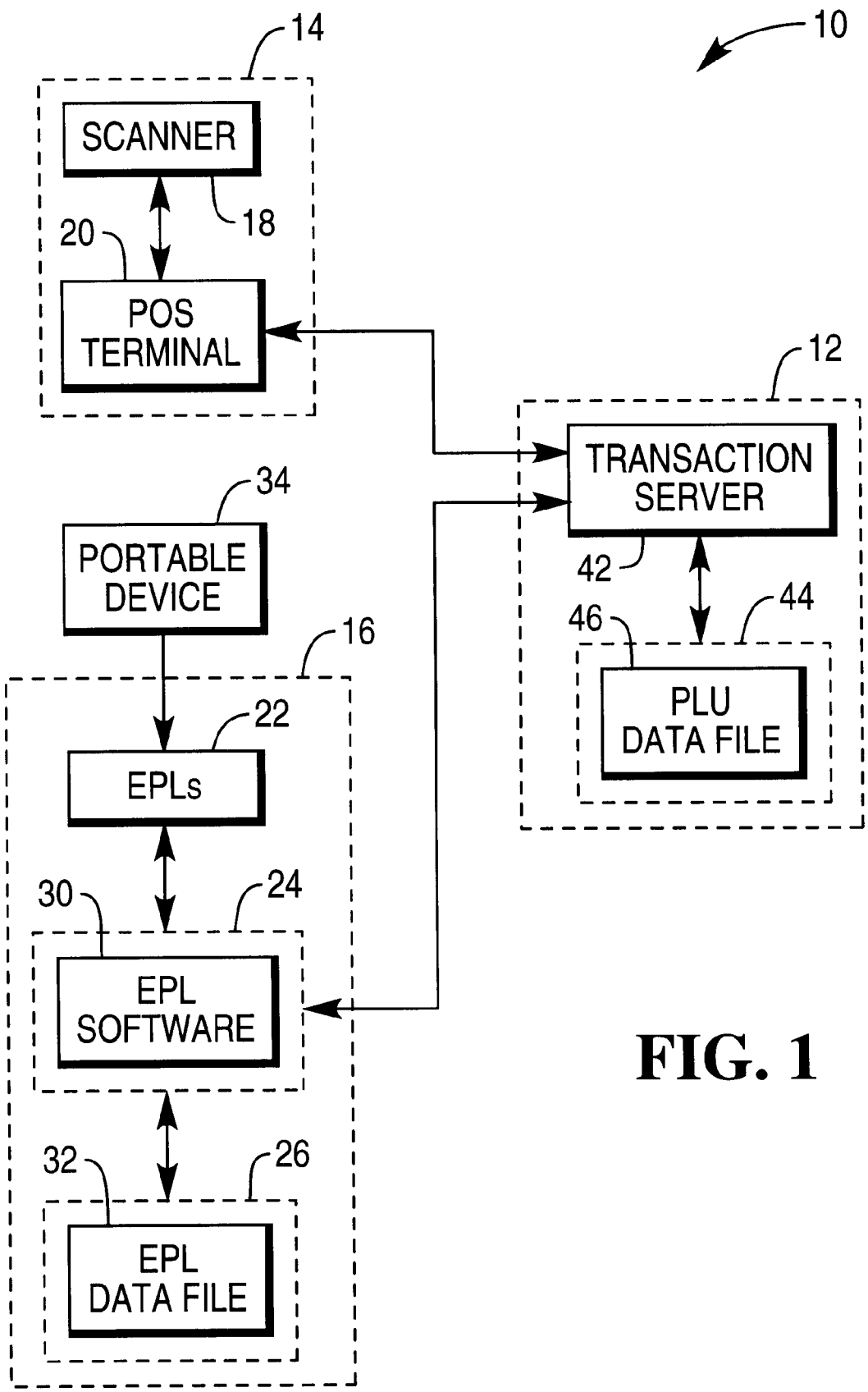
FIG. 1 is a block diagram of a transaction processing system.

Referring now to FIG. 1, transaction system 10 primarily includes host computer system 12, point-of-sale (POS) system 14, and EPL system 16. Here, components 12 and 14 are shown as separate components that are networked together, but they may also form a single component. Thus, host computer system 12 may be a POS terminal which doubles as a host computer for network of other POS terminals.

POS system 14 includes bar code reader 18 and terminal 20.

EPL system 16 primarily includes EPLs 22, host EPL terminal 24, and EPL storage medium 26.

Host EPL terminal 24 executes EPL software 30. EPL software 30 is responsible for scheduling and transmitting price data to EPLs 22. EPL software 30 obtains prices from PLU data file 46.

To assist with execution of certain tasks performed by EPL software 30, EPL terminal 24 includes a built-in time keeping device, commonly referred to as a system clock, which is synchronized with current time, in order to automatically execute the tasks at their scheduled times.

EPL storage medium 26 stores EPL data file 32. EPL storage medium 26 and is preferably a fixed disk drive.

EPL data file 32 contains EPL identification and price checksum information. Price checksum information is calculated from price information in PLU data file 46. EPL data file 32 contains current information displayed by EPLs 22.

Portable device 34 causes EPLs 22 to display business information of interest to store associates, such as plan-o-gram information, sales percentage information, stock in back, and stock level information.

Host computer system 12 includes PLU storage medium 44 and transaction server 42.

Transaction server 42 handles price requests from POS terminal 20. POS terminal 20 sends item identification information to transaction server 42 and transaction server 42 returns the corresponding price from PLU data file 46.

PLU storage medium 44 stores PLU data file 46. PLU data file 46 is available for distribution to POS terminal 20. Provision may be made for direct access to PLU data file 46 by bar code reader 18.

Figure 2:
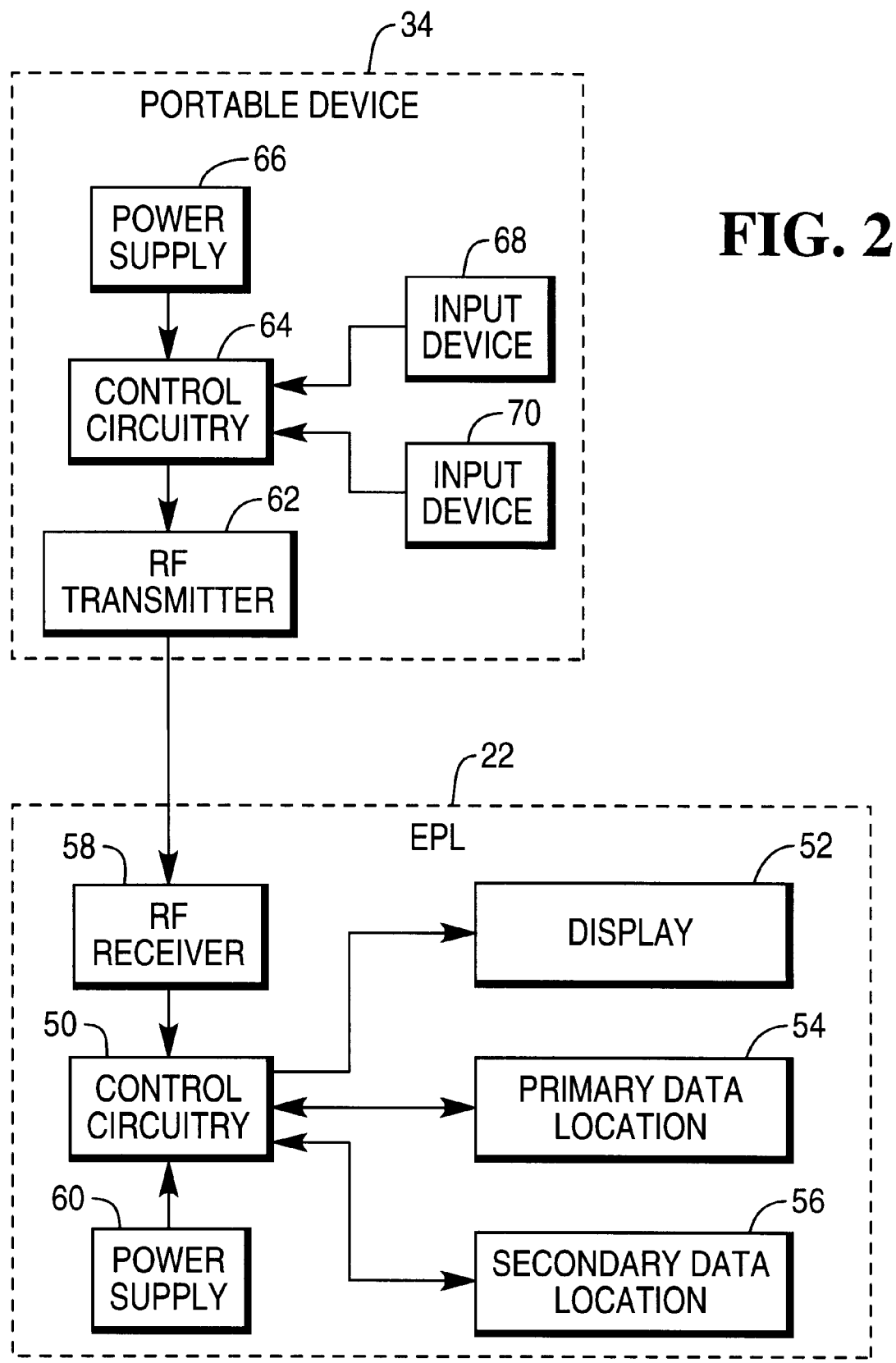
FIG. 2 is a block diagram of an EPL and a portable in accordance with the present invention.

Turning now to FIG. 2, EPLs 22 include control circuitry 50, display 52, primary data location 54, secondary data location 56, RF receiver 58, and power supply 60.

Control circuitry 50 controls operation of EPL 22. Control circuitry 50 also receives incoming messages from host EPL terminal 24 and acknowledges messages from host EPL terminal 24.

Control circuitry 50 enforces security, which may include receiving and checking a password from device 34, to keep someone from another store from coming into the store with a similar device 34 and seeing store sensitive information through EPLs 22.

Display 52 is preferably a liquid crystal display.

Primary data location 54 is a memory which stores price and other information, such as promotional information.

Secondary data location 56 is a memory which stores business information helpful to store associates.

RF receiver 58 listens for a signal from portable device 34. The signal is preferably a single frequency signal.

Power supply 60 is preferably a battery.

Portable device 34 includes RF transmitter 62, control circuitry 64, power supply 66, input device 68, and display 70.

RF transmitter 62 transmits a signal. RF transmitter 62 may include one or more transmitters which transmit over several distances. For example, RF transmitter 62 may transmit over a short distance of about one foot to communicate with a single EPL 22. RF transmitter 62 may transmit over a long distance of about six to eight feet to communicate with a plurality of EPLs 22 on a shelf or section of a shelf.

Control circuitry 64 provides power to RF transmitter 62 to activate it. A store associate may activate RF transmitter 62 and leave it on while working in the store. Alternatively, the store associate may activate RF transmitter 62 as needed for particular items.

Control circuitry 64 also sends a password recorded by input device 68 and transmits it to EPL 22.

Power supply 66 is preferably a battery.

Input device 68 is preferably a keypad which may be used to enter a password and cause RF transmitter 62 to transmit or stop transmitting.

Display 70 is preferably a liquid crystal display.

During normal operation, a store associate carries portable device 34 throughout the store. In order to view business information about a particular product, the store associate must activate RF transmitter 62 using input device 68. Once the store associate enters the password, RF transmitter 62 may broadcast the password several times or continuously.

When the store associate is within range of one or more EPLs 22, control circuitry 50 receives a signal through RF receiver 58 and checks for a correct password. If control circuitry 50 receives the correct password, it changes the displayed information from the contents of primary data location 54 to secondary data location 56. If more than one type of information is available for display, control circuitry may cycle through the different types of information in flashing sequence. When the store associate is out of range, control circuitry 50 changes the displayed information back to the contents of primary data location 54.

Turning now to FIG. 3, the information display method is illustrated in more detail beginning with START 80.

In step 82, control circuitry 50 waits for a signal from RF receiver 58. Portable device 34 is out of range or not switched on.

In step 84, control circuitry 50 receives a signal from RF receiver 58 when RF transmitter 62 is near enough checks for a correct password. If a correct password is received, operation proceeds to step 86, otherwise, operation returns to step 82.

In step 86, control circuitry 50 loads the contents of secondary data location 56 into display 52.

For Example, the store associate may be passing by a shelf and notice that a particular item is in short supply. The store associate may view the corresponding EPL 22 and see that there is additional stock in a back storage room.

As another example, a store may have EPLs 22 and/or item tags on shelves instead of the items themselves. The store associate may wish to determine if an item is in stock. The store associate may view the corresponding EPL 22 and see that the item is in stock.

As yet another example, a store may wish to determine a previous sales history of a product. The store associate may view the corresponding EPL 22 and see the sales history displayed by EPL 22.

In step 88, control circuitry 50 waits for the signal from RF receiver 58 to go away.

In step 90, control circuitry 50 fails to receive a signal from RF receiver 58 when RF transmitter 62 moves away and reloads the contents of primary data location 54 into display 52.

Operation returns to step 82 to wait for another signal from portable device 34.

Although the present invention has been described with particular reference to certain preferred embodiments thereof, variations and modifications of the present invention can be effected within the spirit and scope of the following claims.

I claim:

1. A method of displaying information about an item comprising the steps of:
   (a) displaying first information from a first memory location in an electronic price label;
   (b) receiving a radio frequency signal from a portable transmitter;
   (c) displaying second information from a second memory location in the electronic price label;
   (d) sensing a loss of the radio frequency signal; and
   (e) displaying the first information from the first memory location in response to the loss of the radio frequency signal.

2. The method as recited in claim 1, wherein step a comprises the substep of:
   (a-1) displaying a number of additional stock for the item in a back storage room.

3. The method as recited in claim 1, wherein step a comprises the substep of:
   (a-1) displaying a number of stock for the item in a back storage room.

4. The method as recited in claim 1, wherein step a comprises the substep of:
   (a-1) displaying sales history information for the item.

5. The method as recited in claim 1, wherein step a comprises the substep of:
   (a-1) displaying business information for the item.

6. A method of displaying information about an item comprising the steps of:
   (a) displaying first information from a first memory location in an electronic price label;
   (b) receiving a radio frequency signal from a portable transmitter;
   (c) receiving a password in the radio frequency signal;
   (d) displaying second information from a second memory location in the electronic price label;

(e) sensing a loss of the radio frequency signal; and
(f) displaying the first information from the first memory location in response to the loss of the radio frequency signal.

7. A system of displaying information about an item comprising:

a portable transmitter for transmitting a signal; and an electronic price label including
   a display;
   a memory including a first memory location containing first display information and a second memory location containing second display information, including business information about the item; and control circuitry which receives the radio frequency signal from the portable transmitter and displays the second information from the second memory location in response to the radio frequency signal, senses a loss of the radio frequency signal, and displays the first information from the first memory location in response to the loss of the radio frequency signal.

* * * * *